(12) United States Patent
Buoniconti

(10) Patent No.: US 12,730,992 B2
(45) Date of Patent: Sep. 8, 2026

(54) HANDICAPPED PARKING MONITORING SYSTEM

(71) Applicant: Marc Buoniconti, Pinecrest, FL (US)

(72) Inventor: Marc Buoniconti, Pinecrest, FL (US)

( * ) Notice: Subject to any disclaimer, the term of this patent is extended or adjusted under 35 U.S.C. 154(b) by 0 days.

(21) Appl. No.: 19/078,054

(22) Filed: Mar. 12, 2025

(65) Prior Publication Data

US 2025/0292040 A1 Sep. 18, 2025

Related U.S. Application Data

(60) Provisional application No. 63/564,370, filed on Mar. 12, 2024.

(51) Int. Cl.
*G06K 7/10* (2006.01)
*H04N 7/18* (2006.01)

(52) U.S. Cl.
CPC ......... *G06K 7/10366* (2013.01); *H04N 7/183* (2013.01)

(58) Field of Classification Search
CPC ........................... G06K 7/10366; H04N 7/183
USPC .......................................................... 235/451
See application file for complete search history.

(56) References Cited

U.S. PATENT DOCUMENTS

| | | | |
|---|---|---|---|
| 5,153,586 | A | 10/1992 | Fuller |
| 7,019,670 | B2 | 3/2006 | Bahar |
| 7,104,447 | B1 | 9/2006 | Lopez et al. |
| 7,271,738 | B2 | 9/2007 | Berstis et al. |
| 7,533,809 | B1 | 5/2009 | Robinson et al. |
| 8,799,037 | B2 | 8/2014 | Stefik et al. |
| 8,957,787 | B1 | 2/2015 | Al-Hmalan et al. |
| 9,064,358 | B2 | 6/2015 | Lidror |
| 10,121,172 | B2 | 11/2018 | Hudson et al. |
| 10,691,904 | B1 | 6/2020 | Randall et al. |
| 11,107,296 | B2 | 8/2021 | Vespia et al. |
| 11,495,059 | B2 | 11/2022 | Moran et al. |
| 2015/0179070 | A1 | 6/2015 | Sandbrook |
| 2020/0231141 | A1 | 7/2020 | Edling et al. |
| 2024/0064441 | A1 | 2/2024 | King et al. |

FOREIGN PATENT DOCUMENTS

| | | |
|---|---|---|
| GB | 2152334 | 7/1985 |
| GB | 2461397 | 1/2010 |
| KR | 20060088085 | 8/2006 |
| KR | 20200080217 | 7/2020 |
| WO | WO2022238994 | 11/2022 |
| WO | WO2025193853 | 9/2025 |

*Primary Examiner* — Toan C Ly

(74) *Attorney, Agent, or Firm* — MALLOY & MALLOY, PL

(57) ABSTRACT

A system for monitoring handicapped parking areas including a stanchion disposed adjacent a monitored parking area and a monitoring assembly mounted on the stanchion and disposed in communicating relation with the monitored parking area. The monitoring assembly includes a control unit, which in turn includes a presence detector, a reader and a processor. The presence detector is operative to detect occupancy of a vehicle in the monitored parking area and the reader is configured to determine authorized usage of the vehicle, via a reading of identification data associated with vehicle within the monitored parking area. An indicator assembly is communicatively connected to the reader, via the processor, and is operative to indicate valid and invalid vehicle occupancy of the monitored parking area, based on the processing of the identification data by the processor.

18 Claims, 4 Drawing Sheets

HANDICAPPED PARKING MONITORING SYSTEM

CLAIM OF PRIORITY

The present Non-Provisional patent application is based on and a claim of priority is made under 35 U.S.C. Section 119 (e) to a provisional patent application that is currently in the U.S. Patent and Trademark Office, namely, that having Ser. No. 63/564,370 and a filing date of Mar. 12, 2024, and which is incorporated herein by reference.

BACKGROUND OF THE INVENTION

Field of the Invention

This invention is directed to a system for monitoring a handicapped or disabled parking area, wherein the parking area can include, but is not limited to, one or more parking spaces for vehicles associated with disabled individuals.

DESCRIPTION OF THE RELATED ART

Fraudulent handicapped parking is the number one issue for the disabled community at the local, state and federal level. It is a significant inconvenience and a huge financial burden due to loss of revenue from fraudulent handicapped parking. Known attempts to overcome such problems include the use of disabled or handicapped parking permits which allow a vehicle to park within parking spaces dedicated for the use of disabled individuals.

Typically, such parking permits may come in the form of a "placard" frequently and appropriately labeled with a recognized logo or pictorial representation such as, but not limited to, a wheelchair symbol located on a front or other observable surface of the placard. Such placards are assigned to individuals whose mobility would be significantly impaired by age, illness, disability or infirmity. Such placards are usually mounted on the interior of the vehicle in an area where the placard can be clearly viewed through the front windshield.

Accordingly, while placards and like parking permits are easily viewable by an individual in the vicinity of the front area of a given vehicle, enforcement or determination of authorized or unauthorized parking by police, or other parking enforcement individuals does require the noted physical presence. Therefore, enforcement personnel must still spend tremendous time and resources in locating, arriving at and determining the existence and/or validity of disabled parking permits. Due to the increased number of vehicles parking spaces in many locations have become a premium. This in turn has resulted in violation of handicapped parking areas by non-authorized individuals, which in turn results in significant problems and disadvantages to those individuals which are truly disabled.

Due to the increase number of vehicles in many industrialized countries, major parking problems have developed and remain a continuous problem. These types of problems are made evident by a recognized and noted shortage of parking spaces, as compared to the number of vehicles seeking adequate parking facilities. As a result, parking permits that allow individuals with either long-term or temporary mobility impairment to park in designated handicap parking spaces, normally forbidden to nondisabled individuals, in both public and private facilities are being forged or abused in order to gain convenient and free parking space. By way of example, a phenomenon of altering disabled parking badges is taking place in the form of using a handicapped disabled parking permit by forgers in order to gain access to the restricted parking spaces.

Frequently, forged placards or other parking permits are of such quality that an enforcement individual in the presence of a vehicle demonstrating an apparent valid parking permit is frequently unable to determine the authenticity of the parking permit, thereby allowing unauthorized vehicles frequent and prolonged access to handicap parking areas.

Accordingly, there is a need in this area for efficient, effective and accurate monitoring of parking areas including one or more parking spaces reserved for handicapped or disabled individuals. Such preferred monitoring would eliminate or significantly restrict the review of such disabled parking areas by enforcement personnel. As result, the cost of enforcement would be significantly reduced. In addition, a preferred monitoring system would include a monitoring assembly capable of determining the existence of appropriate, authorized placards or other types of parking permits, and indicate to authorized personnel the validity or invalidity of vehicles parked in restricted parking spaces. In addition, a preferred and proposed monitoring system and assembly may facilitate the generation and issuance of citations to vehicles and/or individuals involved in unauthorized parking in handicapped or disabled as well as other restricted parking areas.

SUMMARY OF THE INVENTION

The present invention is directed to a system for monitoring handicapped or disabled parking areas and combines multiple components collectively operable to obtain and validate identification data indicative of a vehicle's authorization to park in a given handicap parking area. Moreover, the handicapped or disabled parking area may refer, but is not limited to, one or more restricted parking spaces.

In at least one embodiment, the monitoring assembly may be mounted on a stanchion or like support structure disposed adjacent and/or contiguous to the handicap parking area being monitored and in communicating, at least visually observable relation, to the handicap parking area, as well as a vehicle that may be parked therein. In at least one embodiment, the monitoring assembly includes a control unit, mounted on the stanchion, which collectively comprises a presence detector, identification capabilities and a processor.

As explained in greater detail hereinafter, the presence detector is operative to detect occupancy or absence of a vehicle in the handicapped parking area being monitored. In at least one embodiment, the presence detector may be in the form of a camera component, which may be operatively associated with a motion sensor or other sensing device, disposed in observable/communicating relation to the monitored parking area to determine if a vehicle is present and to facilitate activation of the identification capabilities, via the processor. As will be explained in greater detail hereinafter, the camera may also be operable and disposed to capture the license plate of the vehicle occupying the monitored parking space, when such vehicle has backed-in to that space and is an orientation where viewing of an identifying placard, transponder, etc. is not possible by the identification capabilities.

As part of the control unit and in communicative connection with the presence detector/camera, the identification capabilities of the monitoring assembly are configured to determine authorized or non-authorized usage of the monitored parking area by a vehicle. Such authorized or non-authorized use is accomplished by the capture and interpretation of "identification data", embedded by an RFID tag, authorized vehicle transponder, or other electronic, communicative storage component. Such identification data may include the identification of at least one individual associated with the RFID or transponder component, etc. as well as information which provides an indication that the RFID, transponder and/or assigned individual is authorized to occupy a restricted parking space, including handicapped or disabled parking areas.

In at least one embodiment, the identification capabilities may be in the form of a reader comprising one or more fully integrated wireless radio frequency identification readers (RFID) designed for use in parking, security access, electronic vehicle registration (EVR), traffic management, and/or low-speed electronic toll collection applications. Moreover, the reader may also be capable reading vehicle transponders issued by state organizations such as state Turnpike or Expressway authorities. The reader may be a single package that includes an internal antenna and, as set forth herein, may be capable of reading RFID components embedded in a conventional handicap placard and or transponders typically mounted on the interior surface of the front windshield of the vehicle.

The monitoring assembly of the present invention may also include an integrated processor which may be in the form of a single board computer having sufficient design and structure to be utilized in outdoor conditions. The processor is interactive with other components of the control unit including the presence detector/camera and the identification capabilities/reader. The processor is capable of on-off activation of the reader, based on a determination by the camera and cooperatively operative motion sensor that the monitored parking area is or is not occupied by vehicle.

The processor may offer extended operational temperature to make it an adequate fit for industrial IoT applications as well as embedded systems in the industrial control, transportation, Mil/COTS and energy markets. Further, the processor may be operative for configuring the reader component; turning the reader component on/off as may be triggered by the presence detector, based on monitored parking area occupancy. The processor is further configured and operative for processing reads of the identification data from the RFID and/or transponder component.

Yet additional features of the processor, in operative cooperation with the components of the control unit, is activating an indicator assembly; communicating with an external cell phone-based communication device and connecting to LAN/WAN networks for future expansion. Also, the processor may include sufficient storage capabilities and operative features to accomplish transactional logging, wherein entry and exit information, relating to a given monitored parking area is logged and stored for future evaluation.

The drivers cell phone will be utilized to validate that the driver and the handicapped placard are valid and physically onsite. Once the vehicle enters the parking space, the motion sensor will detect that the vehicle has entered the parking space. The monitoring device will sync with the handicapped placard, simultaneously coordinate with State regulatory office to confirm validation and a confirmation text with a security code will be sent to driver/placard holder at which time he will confirm his presence onsite to ensure proper use of the placard. The cell phone and the driver must be present in close proximity of the parking space in order to confirm validation.

In one embodiment the monitoring assembly also includes an indicator assembly mounted on and supported by the stanchion and comprises a coded light structure such as, but not limited to, an indicator light assembly comprising at least an indicator red light and an indicator green light. As utilized, the red light is activated to indicate an invalid or unregistered vehicle occupies a monitored parking area. In contrast, the green light is utilized and activated to indicate the occupancy of a valid or authorized vehicle in the monitored parking area. Activation of the red light and or green light is accomplished by cooperative interaction between the presence detector/camera and the identification capabilities/reader. When the monitored parking area is not occupied, as determined by the presence detector, the indicator assembly, including both of the colored lights may be turned off.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The invention now will be described more fully hereinafter with reference to the accompanying drawings in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention is directed to a monitoring system generally indicated is 100 for monitoring handicapped disabled parking areas 200, which may comprise one or more parking spaces. The monitoring system 100 comprises a monitoring assembly generally indicated as 10, which combines multiple components, as represented throughout the Figures. At least some of the operable components are cooperatively configured and integrated in a control unit 12 and are collectively operable to obtain and validate "identification data" indicative of a vehicle's authorization to park in a given handicap parking area 200.

Figure 1:
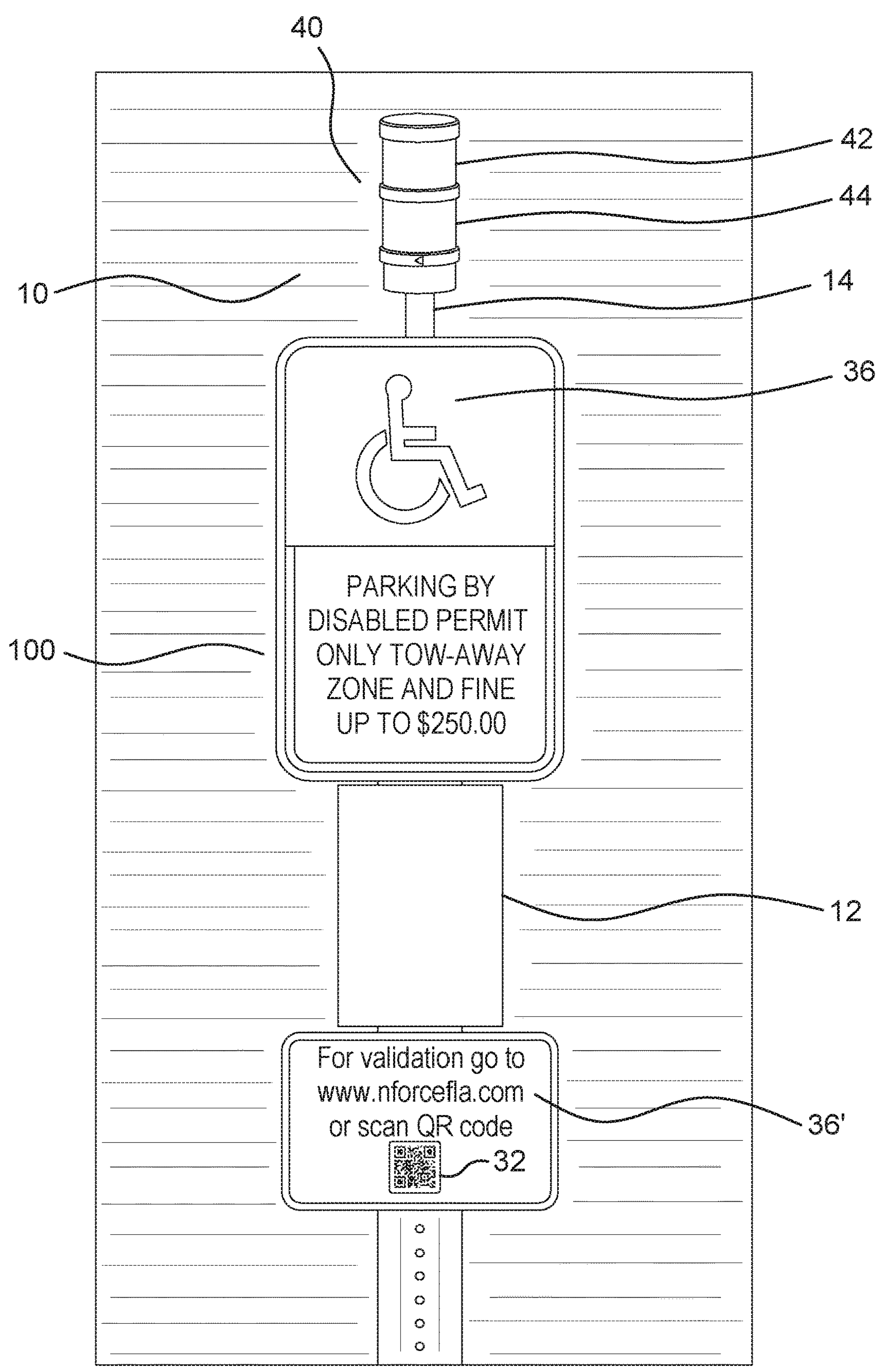
FIG. 1 is a front elevation view of the monitoring system of the present invention including a monitoring assembly mounted on a supporting stanchion.
Figure 2:
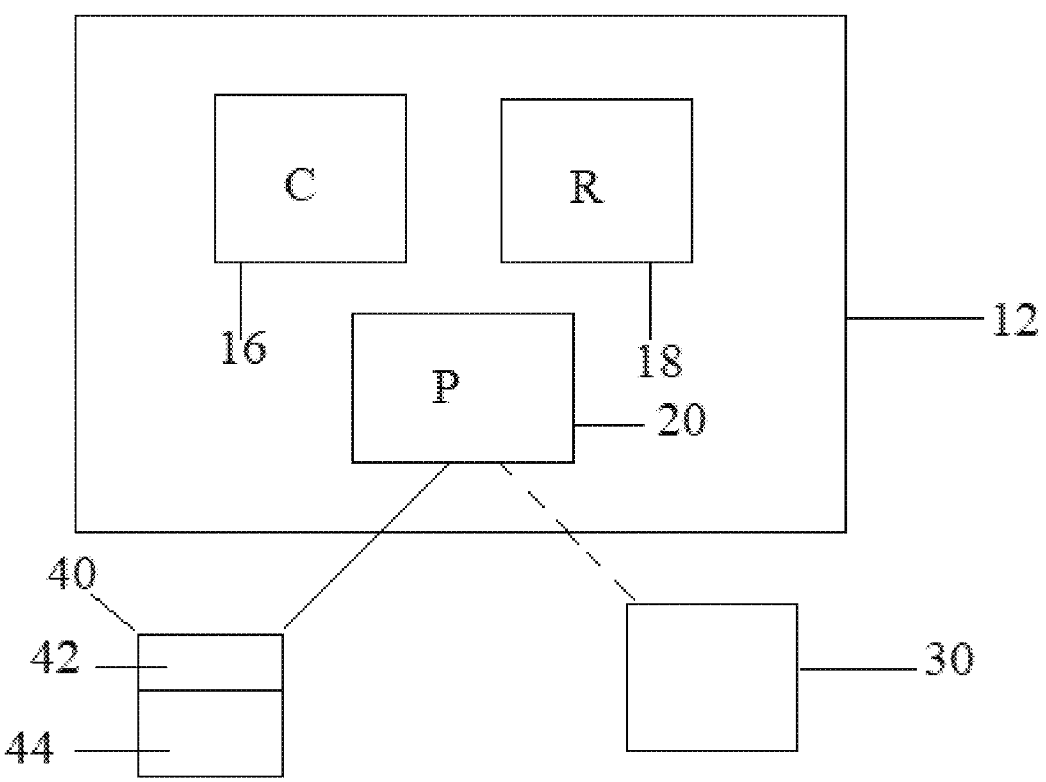
FIG. 2 is a schematic representation in block diagram form of a control unit as an operative part of the monitoring assembly of the embodiment of FIG. 1.

In at least one embodiment, the monitoring assembly 10 may be mounted on a stanchion 14 or like support structure as represented in FIG. 1. The stanchion 14, supported monitoring assembly 10 and included control unit 12 are disposed adjacent and/or contiguous to the handicap parking area 200 being monitored, as schematically represented in at least FIGS. 3 and 4. When so disposed, the monitoring assembly 10 is positioned in communicating, at least visually observable relation, to the monitored handicapped parking area 200, as well as a vehicle 300 when parked therein. In at least one embodiment, the monitoring assembly 10 includes the control unit 12, mounted on the stanchion 14, and as represented FIG. 2, collectively comprises a presence detector 16, which may be in the form of a camera; identification capabilities 18, which may be in the form of a reader and a processor 20.

As explained in greater detail hereinafter, the presence detector/camera 16, in cooperation with a motion sensor (not shown), is operative to detect occupancy or absence of a vehicle 300 in the handicapped parking area 200 being monitored. In at least one embodiment, the presence detector/camera 16 is disposed in a position and/or orientation to visually observe the monitored parking area 200 to determine if a vehicle 300 is present therein. In use, the detector/camera 16 sensor facilitates activation of the identification capabilities/reader, via the cooperative operation of the processor 20. More specifically, upon determination, by the detector/camera 16, of a vehicle 300 occupying a monitored parking area 200, an occupancy signal or the like will be sent to the processor 20, which in turn will activate the identification capabilities/reader 18. Cooperative operation of the camera 16 and processor 18 will serve to deactivate or turn off the reader, once the camera 16 determines that the monitored parking area 200 is not occupied. Therefore, the presence detector/camera 16 will activate the identification capabilities/reader 18 on an "on-off basis", based on whether the monitored handicap parking area 200 is occupied or not.

As an operative part of the control unit 12, the identification capabilities/reader 18, is configured to determine authorized or non-authorized usage of the monitored parking area 200 by a vehicle 300. Such authorized or non-authorized use is accomplished by the capture and interpretation of "identification data", programmed into an RFID component 22, which may be embedded in an otherwise conventional handicapped placard. Further, the identification data May be programmed into a vehicle transponder 24. Such identification data may include the identification of at least one individual associated with the RFID component 22 or transponder component 24, as well as vehicle 200 on which the RFID component 22 and/or transponder component 24 is disposed. Further the identification data provides information such as, but not limited to, name, address, etc. of at least one individual to which the RFID component 22 and/or transponder component 24 is assigned. As such, the identification data represents a valid authorization of a vehicle 300 and/or individual and provides authorization that a given vehicle 300 validly occupies a restricted handicapped parking space 200.

In more specific terms, in at least one embodiment reader 18 comprises one or more fully integrated wireless radio frequency identification readers (RFID) designed for use in parking, security access, electronic vehicle registration (EVR), traffic management, and/or low-speed electronic toll collection applications. In addition, the reader 18 may also be capable reading vehicle transponders 24 of the type issued by state organizations such as state Turnpike or Expressway authorities. The reader 18 may be a single package that includes an internal antenna and, as set forth herein, may be capable of reading RFID components 22 embedded in a conventional handicap placard and or vehicle transponders 24, the latter typically mounted on the interior surface of the front windshield of the vehicle 300.

Figure 3:
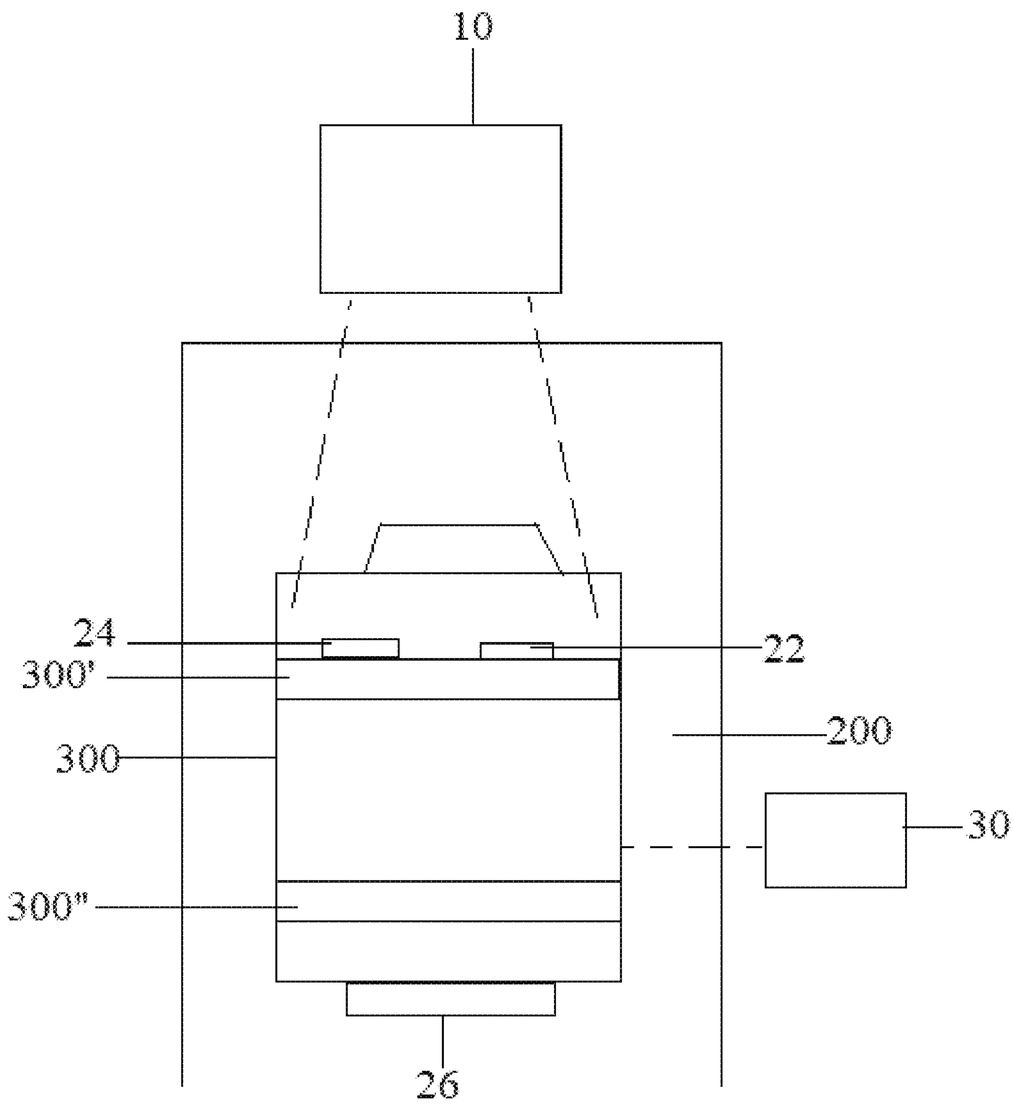
FIG. 3 is a schematic representation of a monitored parking area occupied by a vehicle in a front facing orientation.
Figure 4:
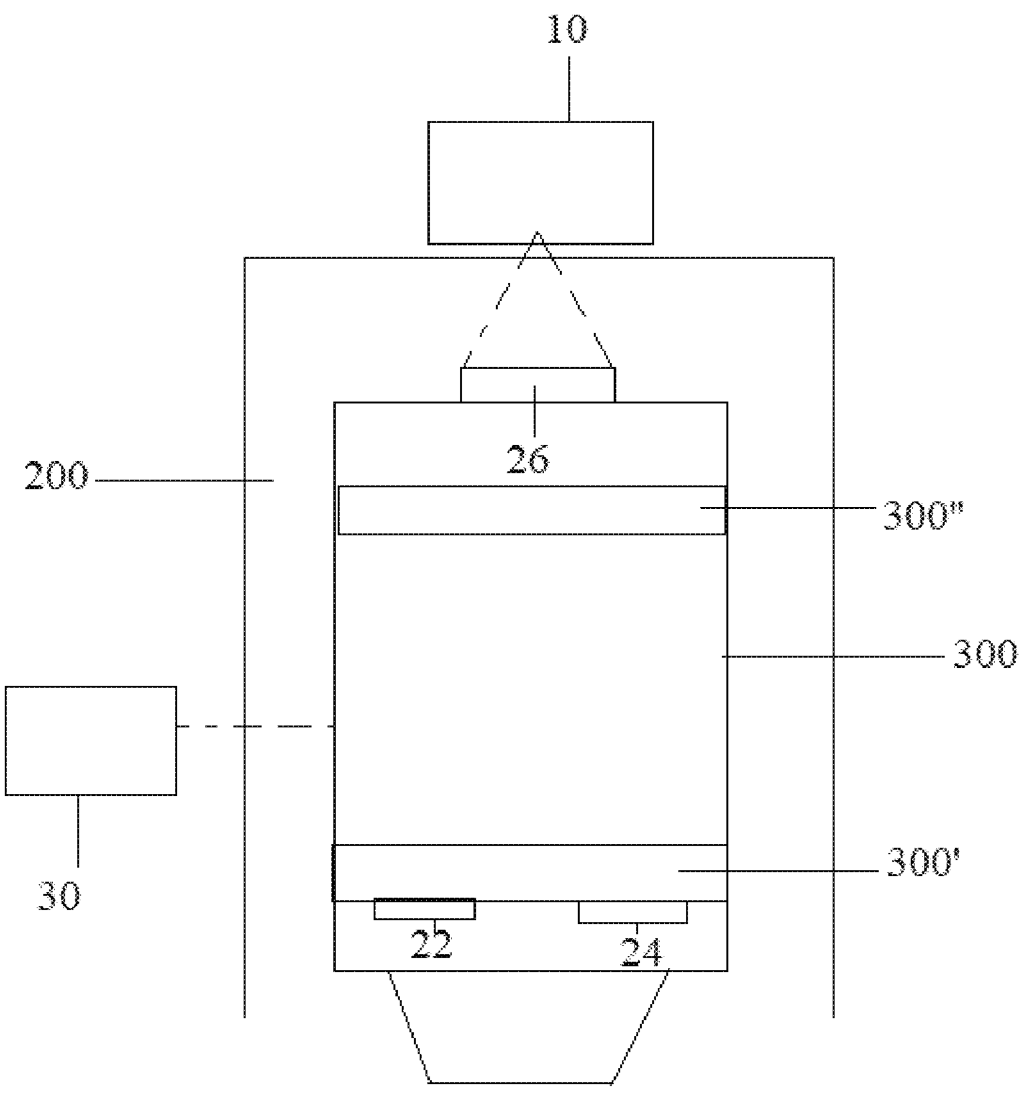
FIG. 4 is a schematic representation of a monitored parking area occupied by a vehicle in a "backed in" orientation different from that of the vehicle orientation of the embodiment of FIG. 3.

Yet another embodiment of the monitoring system 100 of the present invention is schematically demonstrated with primary reference to FIGS. 3 and 4. As intended for use and operation, a vehicle 300 will normally enter a monitored parking area 200 in a front facing orientation (see FIG. 2) such that the RFID component 22 and/or vehicle transponder component 24, disposed generally adjacent a front windshield 300', are facing and clearly observable by the control unit 12, specifically including the reader 18 integrated therein. In the intended and preferred front facing orientation the aforementioned identification data can be readily obtained through capture by the reader 18 and verification processing by processor 20. However, it is contemplated that in at least some instances a vehicle 300 will "back-in" to the monitored handicapped parking area 200, as schematically represented in FIG. 4. In such a "backed-in" orientation the rear window 300" of the vehicle 300 will be facing the stanchion 14 and control unit 12. As a result, the RFID component 22 and/or transponder 24, being typically disposed adjacent the front windshield 300', will most likely not be viewable by the reader 18. As a result, the presence indicator/camera 16 will be further operative to view and capture the identifying number or other identifying indicia of the license plate 26 of the vehicle 300, wherein the license plate 26 will now be in clear visual range of the camera 16.

It is further recognized that positioning a vehicle 300 in the "backed-in" orientation May be inadvertent or otherwise represent no attempt to fraudulently occupy the handicap parking area 200. Under such a scenario, the operator of the vehicle 300 may have a downloaded communicative software application, such as Handicap Monitoring System Phone Application (HPMS App). This downloaded application will facilitate transceiver communication between the operator cell phone 30 and the processor 20. Therefore, under such circumstances, the processor 20 will be triggered by the inability of the camera 16 to view the RFID and/or transponder components 22 and 24. The processor will be automatically activated, under such circumstances, to contact the cell phone 30 within the vehicle 300 or within the immediate vicinity thereof, wherein such communicative contact by the processor 20 will inform the operator to transmit identification information of the monitored parking space 200, utilizing the HPMS App. Thereafter, the user will input and transmit, via the cell phone 30, the parking space identification information 32 located on signage 36 and/or 36', as represented in FIG. 1. Utilization of such two-way communication through the designated HPMS App Will be sufficient "identification data" of the vehicle operator/cell phone user to validate authorized use of the monitored handicap parking space 200.

Therefore, in one embodiment, the cell phone 30 will be utilized to validate that the driver and the handicapped placard are valid and physically onsite. Once the vehicle 300 enters the parking space 200, the detector/camera 16 will detect that the vehicle 300 has entered the parking space 200. The monitoring assembly 10 will sync with the handicapped placard and simultaneously coordinate with State regulatory office to confirm validation and a confirmation text with a security code will be sent to driver/placard holder, at which time confirmation of valid presence onsite to ensure proper use of the placard 24. The cell phone 30 and the driver must be present in close proximity of the parking space 200 in order to confirm validation.

However, it is also recognized that such a "backed-in" orientation of the vehicle 300 May be a purposeful act trying to use the handicap parking area 200 in an unauthorized manner. In such instance, additional information in terms of an individual's identity will be captured by the camera 16 viewing the indicia of the license plate 26 to identify the operator/owner of the vehicle 300. Thereafter, appropriate enforcement authorities may be contacted resulting in the generation and issuance of a citation illegal parking.

The processor 20, integrated into the control unit 12 may be in the form of a single board computer having sufficient design and structure to be utilized in outdoor conditions. As set forth herein, the processor 20 is interactive with other components of the control unit including the presence detector/camera 16 and the identification capabilities/reader 18. As also indicated, the processor 20 is capable of on-off activation of the reader 18, based on a determination by the camera 16 that the monitored parking area 200 is or is not occupied by a vehicle 300.

The processor 20 may offer extended operational capabilities making it an adequate fit for industrial IoT applications as well as embedded systems in the industrial control, transportation, Mil/COTS and energy markets. Further, the processor 18 may be operative for configuring the reader 18; turning the reader 18 on/off, as may be triggered by the camera 16, also based on the monitored parking area 200 being occupied or unoccupied. The processor 20 is further configured for processing reads of the identification data from the RFID and/or transponder components 22 and 24 respectively.

Also, the processor 20 may include sufficient storage capabilities and operative features to accomplish transactional logging, wherein entry and exit information, relating to a given monitored parking area 200, may be accurately defined as transactional log data and is captured and stored for future evaluation.

| Date | Time | Location | Entry/ Exit | Tag ID | Status |
|---|---|---|---|---|---|
| Apr. 3, 2023 | 10:25:45 | 2 | Entry | 004503651010 | Valid |
| Apr. 3, 2023 | 12:05:23 | 2 | Exit | 004503651010 | Valid |
| Apr. 3, 2023 | 14:10:45 | 1 | Entry | 017896541010 | Invalid |
| Apr. 3, 2023 | 14:15:43 | 2 | Entry | 021238521010 | Valid |
| Apr. 3, 2023 | 14:20:12 | 1 | Exit | 017896541010 | Invalid |
| Apr. 3, 2023 | 15:36:25 | 2 | Exit | 021238521010 | Valid |
| Apr. 4, 2023 | 08:56:36 | 1 | Entry | None | Invalid |
| Apr. 4, 2023 | 09:24:32 | 1 | Exit | None | Invalid |

In one embodiment the monitoring assembly also includes an indicator assembly 40 mounted on and supported by the stanchion 14 and comprising a "coded" light structure such as, but not limited to, at least an indicator red light 42 and an indicator green light 44. As utilized, the red light 42 is activated to indicate a vehicle occupancy of a monitored parking area 200 which is either unauthorized or where in the vehicle 300 has not yet been validated to the capture and processing of identification data. In contrast, the green light 44 is utilized and activated to indicate the occupancy of an authorized vehicle 300 in the monitored parking area 200. Activation of the red light 42 and or green light 44 is accomplished by cooperative interaction between the presence detector/camera 16, the identification capabilities/reader 18 and the processor 20. When the monitored parking area 200 is not occupied, as determined by the camera 16, the indicator assembly 40, including both of the colored lights 42 and 44 may be turned off.

Therefore, the monitoring system 100 through utilization of the operative components of the monitoring assembly 10 will be as follows, taking into account the corresponding operation and activation of the indicator assembly 40 including red light 42 and greenlight 44.

When a vehicle 300 first enters a monitored parking space 200, the red-light indicator 42 will automatically be activated by the determination of the vehicle presence utilizing the camera 16. The camera 16, via the processor 20 will then activate the reader 18 for the capture of identification data from either the RFID component 22 or the transponder component 24. Upon establishment that the identification data captured by the processor 20 is determinative of authorized occupancy of the vehicle 300 into the parking space 200, the indication assembly 40 will activate the green light and deactivate the red 42. Upon the exiting of the vehicle 300 from the monitored parking space 200, the camera 16, will detect non-occupancy of the parking space 200, resulting in the processor 20 turning off both the red light 42 and green light 44 of the indicator assembly 40.

In situations involving a fraudulent placard, RFID component and/or transponder component and/or the absence thereof, the first entry of the vehicle 300 into a monitored parking space 200 will again be detected by the camera 16 and cause the activation of a red light 42 via the processor 20. Concurrently, the reader 18 will be activated to read the RFID component and/or transponder component 22 and 24 respectively. If the reader is not able to obtain and/or validate the required identification data from reading the RFID and or transponder components 22 and 24, the red light will remain activated and notification may be sent to local parking enforcement authorities. However, upon a timely exiting of the vehicle 300 from the monitored parking space 200 (possibly due to the red light 42 being continuously activated), the indicator assembly 40 will be deactivated and citation enforcement information may not be generated by the processor, resulting in no citation being issued to the operator/owner of the vehicle 300. In contrast, the vehicle 300 remaining in the monitored parking space 200 may result in the red light 42 continuing to be activated (indicating unauthorized occupancy of the parking space 200) and the issuance of a citation by the local or remote parking enforcement authorities.

It is also to be noted that in at least one embodiment of the monitoring system 100 of the present invention, sending of communications from the control unit 12 and/or processor 20 to one or more local or remote parking enforcement authorities may be accomplished by email, text messaging, push notification and/or cellular contact.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for monitoring handicapped parking areas, said system comprising:

a monitoring assembly disposed in communicating relation with a monitored handicapped parking area, said monitoring assembly comprising a presence detector, identification capabilities, an indicator assembly and a processor, said presence detector operative to detect occupancy of a vehicle in the monitored handicapped parking area, said identification capabilities configured to obtain identification data associated with authorization to occupy the monitored handicapped parking area by the vehicle, said identification data comprising data obtained from at least one of a handicapped parking placard, a vehicle transponder, and an electronic communicative storage component associated with the vehicle or an occupant thereof, said processor communicatively connected with said presence detector, said identification capabilities, and said indicator assembly, and being configured to process said identification data and determine authorized or unauthorized usage of the monitored handicapped parking area by the vehicle, said indicator assembly communicating with said processor and being operative to indicate valid vehicle occupancy of the monitored handicapped parking area when said processor determines authorized usage and to indicate invalid vehicle occupancy of the monitored handicapped parking area when said processor determines unauthorized usage, and wherein, upon an inability of said identification capabilities to obtain the identification data from the vehicle occupying the monitored handicapped parking area, said processor is configured to validate authorized usage of the monitored handicapped parking area through transceiver communication with a mobile communication device associated with an operator of the vehicle and located at or adjacent the monitored handicapped parking area, based at least in part on parking space identification information received from the mobile communication device, the parking space identification information being located on signage associated with the monitored handicapped parking area.

2. The system as recited in claim 1 wherein said presence detector is connected to said identification capabilities and operative, via said processor, to provide on-off activation thereof.

3. The system as recited in claim 2 wherein said presence detector comprises a camera disposed on said monitoring assembly in observable relation to vehicles within the monitored handicapped parking area.

4. The system as recited in claim 2 wherein said identification capabilities comprise a reader disposed in visual communication with a vehicle within the monitored parking area and configured to determine identification data associated with vehicles within the monitored handicapped parking area.

5. The system as recited in claim 4 wherein said reader is configured to read identification data on RFID components disposed on vehicles within the monitored handicapped parking area.

6. The system as recited in claim 4 wherein said reader is configured to read identification data stored on transponder components mounted on vehicles within the monitored handicapped parking area.

7. The system as recited in claim 4 wherein said indicator assembly comprises visually observable indicators connected to said reader and operative, via activation by said processor, to indicate valid and non-valid occupancy of a vehicle within the monitored handicapped parking area.

8. The system as recited in claim 4 wherein said processor comprises communication capabilities configured to establish communicative links located internally and externally relative to the monitored handicapped parking area.

9. The system as recited in claim 8 wherein said processor is communicative, via an external communication link, with external authoritative entities for citation generation against vehicles demonstrating invalid occupancy of the monitored handicapped parking area.

10. The system as recited in claim 8 wherein said processor is connected to said reader and configured to determine validation of said identification data via a communication link with external authoritative entities.

11. The system as recited in claim 8 further comprising a software communication application including transceiver capabilities, said communicative links including contact with mobile communication devices associated with vehicles within the monitored handicapped parking area, via said software communication application.

12. The system as recited in claim 1 wherein said processor comprises storage facilities configured to maintain transactional log data, including vehicle entry and exit data, associated with the monitored handicapped parking area.

13. A system for monitoring handicapped parking areas, said system comprising:

a stanchion disposed adjacent a monitored handicapped parking area, a monitoring assembly mounted on said stanchion and disposed in visual communicating relation with the monitored handicapped parking area, said monitoring assembly comprising a control unit including a presence detector, a reader and a processor, said presence detector operative to detect occupancy of a vehicle in the monitored parking area, said reader configured to obtain identification data associated with authorization to occupy the monitored handicapped parking area by the vehicle, said identification data comprising data obtained from at least one of a handicapped parking placard, a vehicle transponder, and an electronic communicative storage component associated with the vehicle or an occupant thereof, said processor being communicatively connected with said presence detector and said reader and configured to process said identification data and determine authorized or unauthorized usage of the monitored handicapped parking area by the vehicle, wherein said presence detector comprises a camera disposed on said monitoring assembly in observable relation to vehicles within the monitored handicapped parking area, said camera being configured to capture a license plate of the vehicle when said reader is unable to obtain said identification data from the vehicle occupying the monitored handicapped parking area, and an indicator assembly mounted on said stanchion in and communicating with said reader, via said processor, said indicator assembly operative to indicate valid and invalid vehicle occupancy of the monitored parking area.

14. The system as recited in claim 13 wherein said reader is configured to read identification data stored on RFID components and on transponder components mounted on vehicles within the monitored handicapped parking area.

15. The system as recited in claim 13 wherein said processor is communicative, via an external communication link, with external authoritative entities for citation generation against vehicles demonstrating invalid occupancy of the monitored handicapped parking area.

16. The system as recited in claim 15 wherein said processor is connected to said reader and configured to determine validation of said identification data via a communication link with external authoritative entities.

17. The system as recited in claim 13 further comprising a software communication application, including transceiver capabilities and operative for two-way communication with mobile communication devices associated with operators of vehicles within the monitored handicapped parking area.

18. The system as recited in claim 17 further comprising parking area identification information for the monitored handicapped parking area observably disposed on said stanchion, said parking area identification information being captured by the mobile communication device and transmitted to said processor via said transceiver capabilities for use in validating authorized usage of the monitored handicapped parking area.

* * * * *